E. WOOLLEY.
Hat-Brim.

No. 204,646.  Patented June 4, 1878.

Attest:
Thos. S. Crane.
Joseph H. Emo

Inventor.
Edwin Woolley
By Horace Harris
Atty

UNITED STATES PATENT OFFICE.

EDWIN WOOLLEY, OF NEWARK, NEW JERSEY, ASSIGNOR TO SEELEY & SOLLEY, OF NEW YORK, N. Y.

IMPROVEMENT IN HAT-BRIMS.

Specification forming part of Letters Patent No. 204,646, dated June 4, 1878; application filed May 3, 1878.

*To all whom it may concern:*

Be it known that I, EDWIN WOOLLEY, of Newark, in the county of Essex and State of New Jersey, have invented a new and useful Improvement in Hat-Brims, which improvement is fully set forth in the following specification and accompanying drawings, in which—

Figure 3:
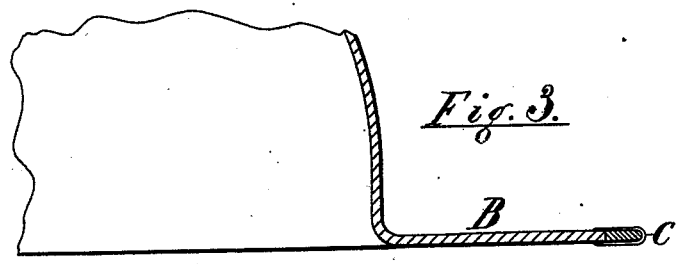
Figure 1:
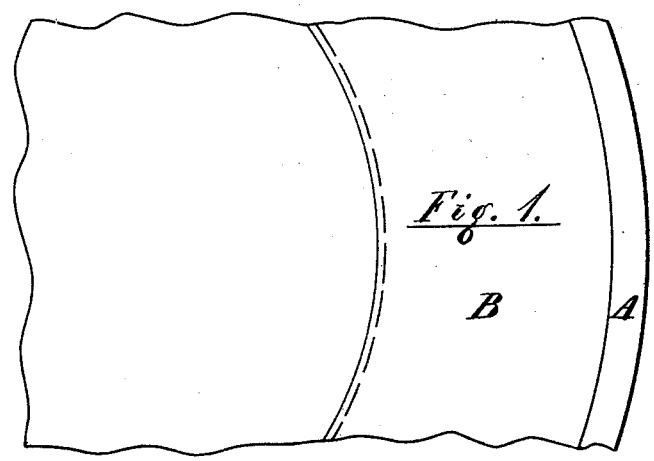
Figure 2:
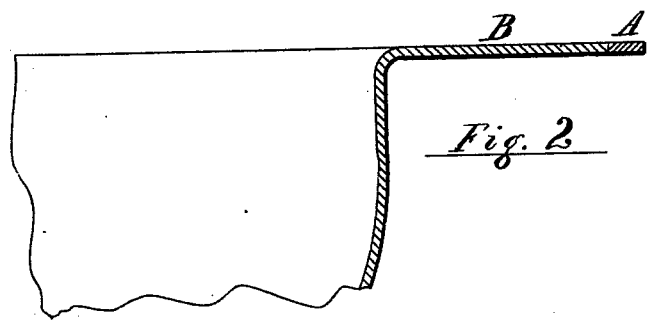

Figure 1 is a plan. Fig. 2 is a section showing the edge without the binding. Fig. 3 is the same with the binding.

The object of my invention is to give elasticity to hat-brims, so that they will retain or regain their proper shape, though they may be subject to much irregular usage, and this by means more perfect than any formerly employed.

For this purpose I make a supplemental outer edge, A, for the brim B, of vulcanized rubber, or gutta-percha as an equivalent substance. The rubber edge is made about the thickness of the hat, and may or may not be made fast to the brim. It may be made fast and finished as an edge, and used without the aid of binding, as in Fig. 2; but ordinarily I will place the rubber on the edge of the brim, when the binding, which laps on each side over onto the brim, being stitched through both edges and through the brim, will hold the rubber in position. After the brim has been prepared with the rubber it is put in a heated former and receives the desired shape, which it will perfectly retain after it has become cold, even though it be submitted to a large amount of rough usage.

This improved rubber edge is designed for all hats to which it may be applied, being especially adapted to improve soft or elastic hats, fur, straw, or hats of other material.

I do not claim, broadly, making an elastic edge for hat-brims; but my invention is in the new material used, being especially adapted to the purposes set forth.

I claim—

1. The hat-brim B, having the supplemental elastic edge A, of rubber or gutta-percha, substantially as and for the purpose specified.

2. The hat-brim B, having the edge A, of elastic rubber, held in position by the binding C, substantially as set forth.

EDWIN WOOLLEY.

Witnesses:
 HORACE HARRIS,
 JOSEPH A. ENO.